(12) United States Patent
Muller et al.

(10) Patent No.: US 8,019,772 B2
(45) Date of Patent: Sep. 13, 2011

(54) COMPUTER METHOD AND APPARATUS FOR TAG PRE-SEARCH IN SOCIAL SOFTWARE

(75) Inventors: Michael Muller, Medford, MA (US); Andrew L. Schirmer, Andover, MA (US); Casey Dugan, Everett, MA (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 11/951,094

(22) Filed: Dec. 5, 2007

(65) Prior Publication Data

US 2009/0150342 A1 Jun. 11, 2009

(51) Int. Cl.
*G06F 17/30* (2006.01)
(52) U.S. Cl. ............ 707/767; 707/708; 707/771; 703/2
(58) Field of Classification Search .................. None
See application file for complete search history.

(56) References Cited

U.S. PATENT DOCUMENTS

| | | | |
|---|---|---|---|
| 2002/0103794 A1 | 8/2002 | Chang | |
| 2005/0050163 A1* | 3/2005 | Cole et al. ..................... | 709/217 |
| 2005/0080776 A1* | 4/2005 | Colledge et al. .................. | 707/3 |
| 2005/0102278 A1* | 5/2005 | Okumura ........................... | 707/3 |
| 2005/0283473 A1* | 12/2005 | Rousso et al. .................... | 707/5 |
| 2006/0004892 A1 | 1/2006 | Lunt et al. | |
| 2006/0242178 A1 | 10/2006 | Butterfield et al. | |
| 2006/0282328 A1* | 12/2006 | Gerace et al. .................. | 705/14 |
| 2007/0005646 A1 | 1/2007 | Dumais et al. | |
| 2007/0008321 A1* | 1/2007 | Gallagher et al. ............ | 345/473 |
| 2007/0016553 A1 | 1/2007 | Dumais et al. | |
| 2007/0078832 A1* | 4/2007 | Ott et al. ........................... | 707/3 |
| 2007/0112742 A1 | 5/2007 | Dumais et al. | |
| 2007/0118430 A1 | 5/2007 | Wiseman et al. | |
| 2008/0091549 A1* | 4/2008 | Chang et al. ..................... | 705/26 |
| 2008/0091670 A1* | 4/2008 | Ismalon ........................... | 707/5 |
| 2008/0092044 A1* | 4/2008 | Lewis et al. ..................... | 715/713 |
| 2008/0114573 A1* | 5/2008 | Hsieh et al. ....................... | 703/2 |
| 2008/0140643 A1* | 6/2008 | Ismalon ........................... | 707/5 |
| 2008/0201651 A1* | 8/2008 | Hong et al. ................... | 715/764 |
| 2008/0294621 A1* | 11/2008 | Kanigsberg et al. ............. | 707/5 |
| 2009/0083278 A1* | 3/2009 | Zhao et al. ...................... | 707/10 |

FOREIGN PATENT DOCUMENTS

WO WO 2004/114163 A2 12/2004

\* cited by examiner

*Primary Examiner* — Cam Y Truong
*Assistant Examiner* — Dung K Chau
(74) *Attorney, Agent, or Firm* — Hamilton, Brook, Smith & Reynolds, P.C.

(57) ABSTRACT

A computer-implemented method and system for tag-based searching. One or more initial tags are entered or otherwise input by a user. The invention system determines related tags to the user entered initial tags and enables user review of the determined related tags. The user selects from the determined related tags and forms an improved tag-based search relative to the initial tags. Methods employed for determining related tags include conventional frequency of co-occurrence method, a lexical method, a semantic method, a user list method, a recency method, a reference database method and a resource method. The invention method/system also allows the user to store selected components of those searches for future use/reuse. The invention also allows the user to share selected components with selected other users.

15 Claims, 3 Drawing Sheets

COMPUTER METHOD AND APPARATUS FOR TAG PRE-SEARCH IN SOCIAL SOFTWARE

BACKGROUND OF THE INVENTION

So called "Social software" generally enables social networking and social (collaborative) computing. Such Social software systems often make use of tag-based storage, tag-based indexing, and tag-based search where "tags" are user defined descriptors. A weakness of current technologies is that a user who wants to perform a tag-based search may not be aware of other, related tags that could make the search more effective.

There is some literature on searching tag-based social software systems to understand the relationships among the tags. The use of tagclouds is one example. Tagclouds are used in most tag-based social software systems to indicate tags that are related to an indexical tag (or tags that are associated with an indexical non-tag data item, such as a person or a resource). There are a few systems, such as Dogear and Quintura, that provide for sequential searches of tags, usually based on the following steps:

The user enters a tag to be searched
The system provides a visual display of a structure similar to a tagcloud, focused on the user's tag and displayed related tags.
The user selects one of the displayed tags, usually through a method of direct manipulation.
The system uses that selected tag as the entry for a second tag-based search.
During the step of the visual display, some systems also display a list of the resources (e.g., bookmarks) most strongly associated with the entered tag.

SUMMARY OF THE INVENTION

The present invention addresses the problems of prior art. In particular the present invention provides an intervening step, Tag Pre-Search, that can improve the effectiveness of the user's tag-based search.

The Tag Pre-Search step allows the user to enter one or more tags, and then to review additional tags that are related to that one or more tags. The user may optionally add one or more of the additional tags to her/his search. The invention method/system allows the user to select among multiple methods for determining the relatedness of the additional tags. Included are conventional frequency of co-occurrence method, a lexical method, a semantic method, an expert method, an organizational method, a social metric method, a user list method, a recency method, a reference database method and a resource method. The invention method/system also allows the user to store selected components of those searches for future use/reuse. The invention also allows the user to share selected components with selected other users.

In a preferred embodiment, a computer-implemented method and apparatus provides tag-based searching by, in part, (i) receiving one or more initial tags as entered by a user, and (ii) determining related tags to the user entered initial tags. Next the method/apparatus provides user review of the determined related tags and enables user selection thereof. The user selected related tags are then used to form an effectively improved tag-based search relative to the initial tags. That is, the invention method/apparatus allows the user to compose a new and improved tag-based search using the user selected related tags.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
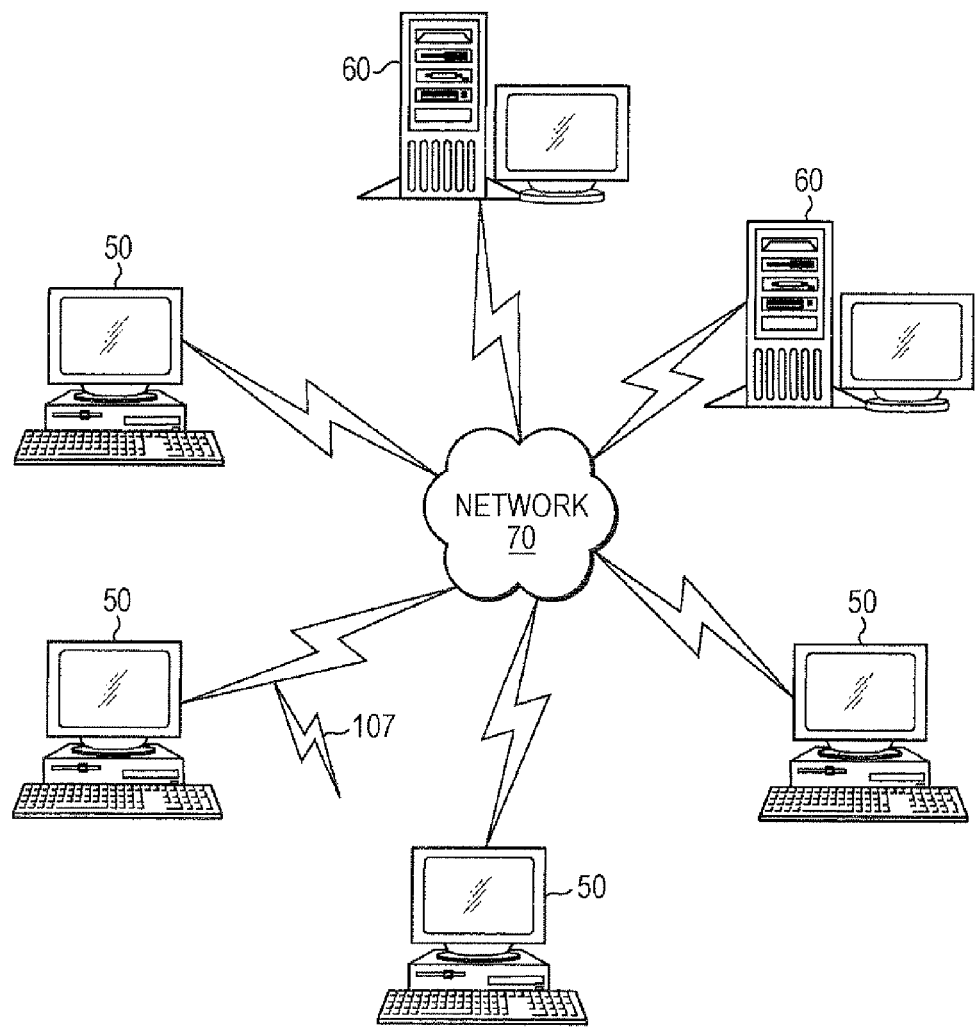
FIG. 1 is a schematic diagram of a computer network in which embodiments of the present invention are implemented.
Figure 2:
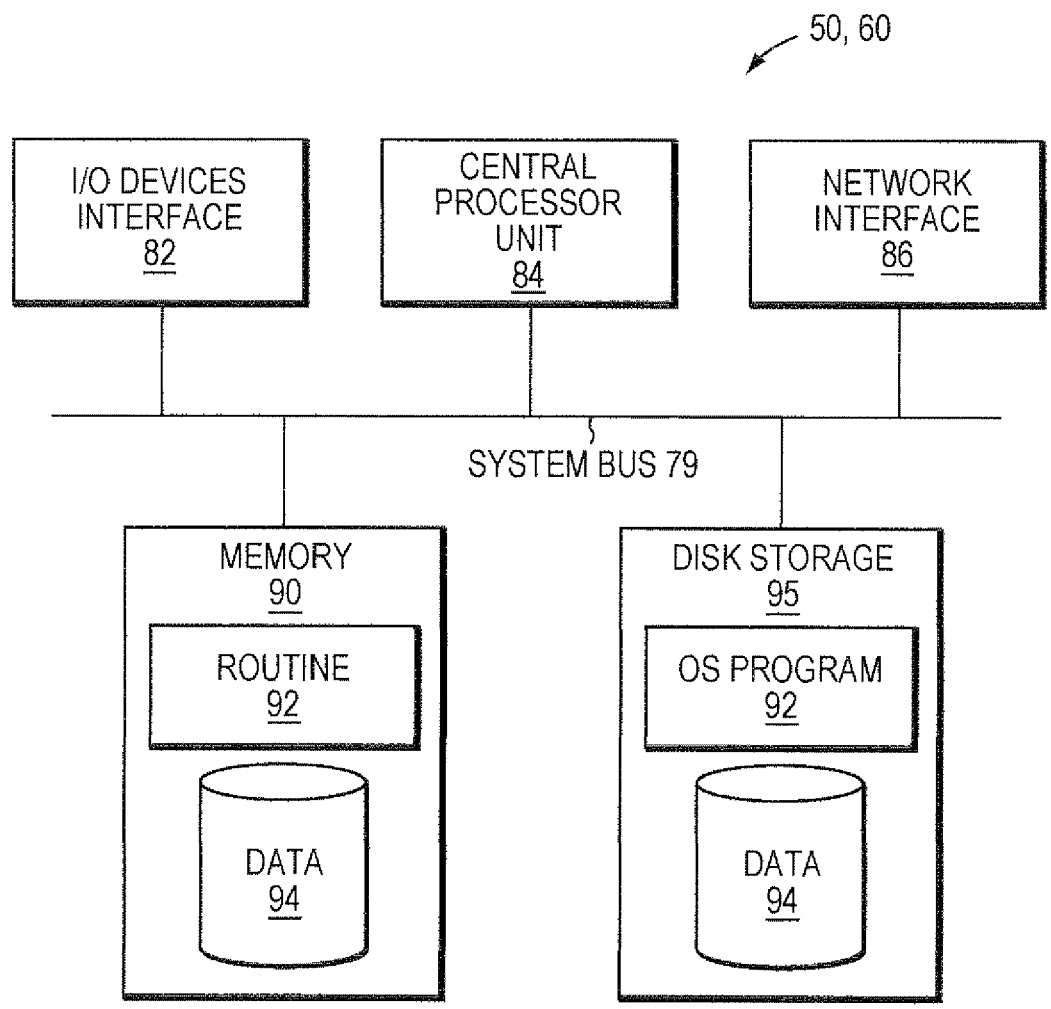
FIG. 2 is a block diagram of a computer node in the computer network of FIG. 1.

Embodiments of the present invention are implemented in computer networks, i.e. a plurality of computers couple to communication means. In some embodiments, the computer network is a global computer network such as the Internet. FIGS. 1 and 2 are illustrative.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 2 is a diagram of the internal structure of a computer (e.g., client processor/device 50 or server computers 60) in the computer system of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions 92 and data 94 used to implement an embodiment of the present invention (e.g., search engine 11 and supporting user interactive code detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes and tapes.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Figure 3:
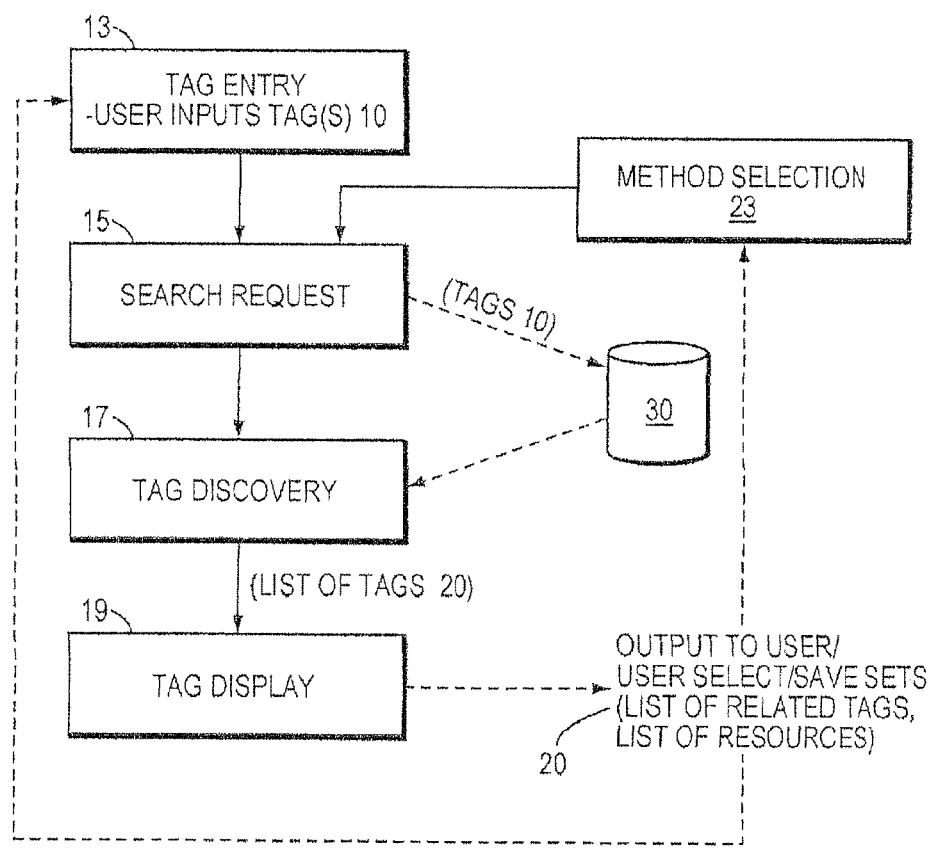
FIG. 3 is a schematic diagram of an embodiment of the present invention.

Illustrated in FIG. 3 is a search engine 11 embodying the present invention. Through the search engine 11, a first user wishes to search a first social software system using a tag-based search. In a first step 13 of the tag-based search, i.e. the Tag-Entry, the user enters a first tag 10. In response, the search engine 11 formulates a search request 15 representing the user's request that the social software system search its database 30 using the first tag 10.

Next in a Tag Discovery step 17, the invention system uses conventional tag statistics (e.g., frequencies of tag co-occurrence) and generates a list 20 of tags that are highly associated with the first tag 10 entered by the user. Other known techniques may be used to generate the list 20 of associated or related tags.

In a following Tag Display step 19, the system (search engine) 11 displays to the user for review (i) the list 20 of related tags and (ii) a list of resources associated with the first tag 10 (i.e., in conventional usage, the user-visible aspects of the bookmarks in which the tag occurs).

Optionally, the user may enter more than one tag in the Tag Entry step 13. In this case, the Search Request step 15 proceeds as before, but in accordance with the present invention the Tag Discovery step 17 now retrieves tags relevant to the multiple tags that were entered in the Tag Entry step 13. In the Tag Display step 19, the system 11 may (a) display all of the retrieved related tags in a single list and/or (b) may segregate the display into separate lists for each of the tags 10 that the user entered in the Tag Entry step 13. From either display, the user is effectively provided farther tags with which to add to and improve his search.

In order to initiate system 11 retrieval of multiple tags, the user chooses a method (step 23) of finding related tags. One or more of the following methods may be provided.

Conventional Method: Conventional tag co-occurrence's determined across the entire database 30 (as described above).

Lexical Method: Tags are derived by lexical analysis applied to the first tag 10 entered by the user. Examples of lexical analysis include case-consistency (for instance "SocialSoftware" versus "socialsoftware"), stemming, de-prefixing and expanding from common roots. Other known lexical analysis may be used. Note although these are known lexical analysis techniques, they have not been applied to the problem of tag pre-search until this invention. (See Note C below.)

Semantic Method: Tags that are semantically related to the user's first tag 10 (e.g. synonyms from a dictionary or the translation of the tag in other languages) are determined. (See Note C below.)

Expert Method: Tags with high co-occurrence to the user's first tag 10, as defined by the usage of experts are determined. Expertise may be defined either by (i) reference to a second database (known by the system 11 to include tags) of designated experts or by (ii) finding, within the first social software system, a specified number of users who correspond to one of the following criteria: highest frequencies of usage of the first tag 10 entered by the user (see Note C, below), highest relative proportion of usage of the first tag 10 entered by the user, in comparison with other tags used by each potential expert (see Notes A, B, below).

Organizational Method: Tags with high co-occurrence to the user's first tag 10, as defined by the usage of users in the first user's organization or team, are determined. This method can also utilize levels of an organizational hierarchy to define or refine teams. For example, the user could define a set of people one job level above, or all people directly above, or peers on the same level, etc. where an organizational unit may be defined: by reference to a second database (known by the system 11 to include tags) of designated organizational structures, or by selection of the user from a predefined set of common organizational relationships, such as peers, superiors, subordinates, direct superiors, first-degree subordinates, etc. (See Notes A, B, below.)

Social Metric Method: Tags with high co-occurrence to the user's first tag 10, as defined by the usage of other users whose tag usage is statistically similar to that of the first user are determined. Note that the social metrics of similar interests have been used to make recommendations in other domains, including assignees own work, such as LOT820050228, but not in tag pre-search until the present invention. (See Notes A, B, below).

User List Method: Tags with high co-occurrence to the user's first tag 10, are determined. "High co-occurrence" is defined by a list of other users who are selected and added to that list by the first user. (See Notes A,B below.) Optionally, the user may select from a previously saved list of other users (see Note B, below).

Recency Method: Tags with high co-occurrence to the user's first tag 10, are determined as defined by the frequencies of tag co-occurrence across the entire database 30, for bookmarks that were most recently used. The temporal criterion for "recent" may optionally be set as a database parameter, or may optionally be specified by the user. (See Note C, below).

Reference Database Method: Tags with high co-occurrence to the user's first tag, as defined by their usage in a second social software system's database are determined. (See Note D below).

Resource Method: Tags with high co-occurrence to the user's first tag(s) 10, as defined by the occurrence of the user's first tag(s) 10 within one or more particular tagged resources, such as bookmarks, documents, people information, etc. are determined. These resources may be specified in advance (see Note E, below), or they may be specified by the user as a set of resources to be searched sequentially in a user-specified (or system-specified) order of search. (See Note E, below).

After selecting a method (step 23), the user requests a new set of tags (i.e., a repetition of the Search Request step 15, above). The method selected in the Method Selection step 23, above, is used in place of the generic method in the Tag Discovery step 17, above. Optionally, only those tags found during the Tag Discovery Step 17 that were previously present in the system 11 are provided to the user. This optional step is needed to prevent possible data overflow, in the event that externally-provided tags (e.g., in the Semantic Method and the Reference Database Method) may not yield any results in the first database 30.

Lastly, the user may select one, two or more tags from the tags List 20 in the Tag Display step 19, to compose a new tag search. In some embodiments, the action of selecting may be done via pointing or tabbing, or other direct methods that do not require re-typing the text of each tag (see Note C, below). The user may then repeat the Search Request step 15, using this selected and effectively improved set of tags. In this way, the present invention improves the effectiveness of a user's tag-based search.

Notes A, B, C: Additional options may be applied to certain of the preceding steps. Each of the below options is illustrated generally by the dashed lines in FIG. 3, Note A: Optionally, the user may edit the list of other users before the tag pre-search.

Note B: Optionally, the user may save the set of other users as a group of users (optionally providing a name to that group of users, for ease of later access), that can be re-used (e.g., in the User List Method).

Note C: Optionally, the user may save the set of tags as a group of tags (optionally providing a name to that group of tags, for ease of later access), which can be re-used (e.g., in the Tag Entry step 13).

Note D: Optionally, the user may save the specification of the second social software database, optionally including other parameters such as tags or users names (optionally providing a name to that set of database name and parameters, for ease of later access), which can be re-used (e.g., in the Reference Database Method).

Note E: Optionally, the user may save the set of particular resources as a group of resources (optionally providing a name to that group of resources, for ease of later access), which can be re-used (e.g., in the Resource Method).

In addition, embodiments of the present invention provide Sharable Search Components. For all Notes B, C, D, and E the first user may make the saved sets of user names, tags, or database specifications (respectively) available to a second user for her/his use.

Accordingly, the present invention improves upon the prior art by determining and using relationships between tags as applicable to social tagging. By connecting or relating other tags to the ones specified by the user prior to issuing a search the present invention provides pre-search capabilities allowing the user to refine a candidate search before submitting it. Restated, the present invention turns a tag-based search into a two step process allowing users to manually refine and redefine their searches in the later step using tag metadata (relationships of tags).

In further distinction over prior art, the present invention enhances a user's search for objects in a social software system. The invention method/system suggests additions to the user's candidate search using pre-existing metadata on the objects. The approach of the present invention does not add additional metadata to the objects. Instead in the present invention additional tag metadata is presented to the user in order to enable and assist the user in refining or redefining his candidate (initial) search using the various selection methods 23 discussed above. Note the selection methods 23 are not grammar-based. Some embodiments may include grammar based selection methods 23.

Further the present invention deals with searches that are executed dynamically and are often refined by the user and resubmitted. In the present invention, the user chooses the terms of the search and the invention system assists the user in choosing terms that have been revealed through the original search or through secondary searches of related matter. Thus the present invention differs from prior art search systems that store pre-defined and pre-executed searches indexed (or reviewable) by a predetermined set of keywords in terms of:

(a) predefined and pre-executed searches of prior art versus current, dynamic searches;

(b) pre-selected key words of prior art versus current user-selection of any tag or tags; and (c) use of a single database or search versus use of secondary or support searches to assist in the refinement of the primary (initial candidate) search.

While this invention has been particularly shown and described with references to example embodiments thereof, it will be understood by those skilled in the art that various changes in form and details may be made therein without departing from the scope of the invention encompassed by the appended claims.

For example, the computer architecture and configuration of FIGS. 1 and 2 are for purposes of illustration not limitation. Other computer and/or network configurations are suitable.

Further, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The "tags" of the present invention are user created descriptors in a collaborative tagging system or "social tagging". The tags are attributes of objects in a social software system and are within the Web 2.0 meaning of user-created descriptor.

What is claimed is:

1. A computer-implemented method of tag-based searching comprising the steps of:
    in a computer initiating a tag-based search including, receiving one or more initial tags entered by a user defining the initiated tag-based search using the one or more initial tags;
    intervening and before issuing a search request representing the initiated tag-based search, using a processor responsive to the computer and automatically determining related tags to the user entered initial tags, said determining including using a method defined by tag usage of users in the user's organization, and employing a user selected method of determination,
    wherein the user selected method is any of a method defined by reference to a database of designated experts; a method defined by reference to a first social software system having at least one of the highest frequencies of usage of one initial tag entered by the user, the highest relative proportion of usage of the one initial tag entered by the user, in comparison with other tags used by each potential expert; a method defined by usage of other users whose tag usage is statistically similar to that of the user; a method defined by a list of other users who are selected and added to that list by the user; a method defined by the frequencies of tag co-occurrence across a given database; and a method defined by occurrence of the user's one initial tag within one or more particular tagged resources including bookmarks, documents and people information;
    presenting the determined related tags to the user in a manner enabling and assisting the user in refining and redefining the initiated tag-based search; and
    from user reviewing of the determined related tags and selection there from through the computer, forming an effectively improved tag-based search relative to the initiated tag-based search using the initial tags, the formed improved tag-based search using the user selected related tags.

2. The method as claimed in claim 1 wherein the step of forming includes allowing the user to compose a new tag-based search using the user selected related tags.

3. The method as claimed in claim 1 further comprising saving a set of other user names as a user group in a manner enabling reuse of the set of other user names.

4. The method as claimed in claim 1 further comprising saving a set of tags as a tag group in a manner enabling reuse of the set of tags.

5. The method as claimed in claim 1 further comprising saving a set of database parameters and name in a manner enabling reuse of specifications of the database.

6. The method as claimed in claim 1 further comprising saving a set of resources as a resource group in a manner enabling reuse of the set of resources.

7. Computer apparatus for tag-based searching comprising:
    a computer readable storage medium;
    a tag entry member embodied on the computer readable storage medium receiving one or more initial tags entered by a user initiating and forming a candidate search using the one or more initial tags; and
    a two step search engine embodied on the computer readable medium and responsive to the user entered initial tags intervening the initiated candidate search before a corresponding search request is issued, in a first step, the search engine automatically determining related tags to the user entered initial tags, said determining including using a method defined by tag usage of users in the user's organization, and the search engine employs a user selected method of determination of related tags,
    wherein the user selected method is any of a method defined by reference to a database of designated experts; a method defined by reference to a first social software system having at least one of the highest frequencies of usage of one initial tag entered by the user, the highest relative proportion of usage of the one initial tag entered by the user, in comparison with other tags used by each potential expert; a method defined by usage of other users whose tag usage is statistically similar to that of the user; a method defined by a list of other users who are selected and added to that list by the user; a method defined by the frequencies of tag co-occurrence across a given database; and a method defined by occurrence of the user's one initial tag within one or more particular tagged resources including bookmarks, documents and people information; and
    in a second step, the search engine presenting the determined related tags to the user in a manner enabling and assisting the user in refining and redefining the initiated candidate search, the search engine enabling user review of the determined related tags and user selection there from in a manner forming an effectively improved tag-based search relative to the initiated candidate search.

8. The computer apparatus as claimed in claim 7 wherein the effectively improved tag-based search is formed by the search engine allowing the user to compose a new tag-based search using user selected related tags from the determined related tags.

9. The computer apparatus as claimed in claim 7 wherein the search engine further enables the user to save a set of other user names as a user group in a manner enabling reuse of the set of other user names.

10. The computer apparatus as claimed in claim 7 wherein the search engine further enables the user to save a set of tags as a tag group in a manner enabling reuse of the set of tags.

11. The computer apparatus as claimed in claim 7 wherein the search engine further enables saving a set of database name and parameters in a manner enabling reuse of specifications of the database.

12. The computer apparatus as claimed in claim 7 wherein the search engine further enables saving a set of resources as a resource group in a manner enabling reuse of the set of resources.

13. A computer system providing tag-based searching comprising:

tag entry means recorded on a computer readable storage medium and enabling a user to initiate a subject search including input one or more initial tags of the subject search;

first search means recorded on a computer readable storage medium for intervening the initiated subject search and determining related tags to the user input initial tags before a search request representing the subject search is submitted, said determining including using a method defined by tag usage of users in the user's team, and the first search means employs a user selected method for determining related tags, wherein the user selected method is any of a method defined by reference to a database of designated experts; a method defined by reference to a first social software system having at least one of the highest frequencies of usage of one initial tag entered by the user, the highest relative proportion of usage of the one initial tag entered by the user, in comparison with other tags used by each potential expert; a method defined by usage of other users whose tag usage is statistically similar to that of the user; a method defined by a list of other users who are selected and added to that list by the user; a method defined by the frequencies of tag co-occurrence across a given database; and a method defined by occurrence of the user's one initial tag within one or more particular tagged resources including bookmarks, documents and people information; and second search means recorded on the computer readable storage medium for (i) presenting the determined related tags to the user in a manner enabling and assisting the user in refining and redefining the initiated subject search, and for (ii) providing user review of and selection from the determined related tags, in a manner such that user selected related tags are used to form an improved tag-based search relative to the initiated subject search, the second search means allowing the user to compose the improved tag-based search before the search request representing the subject search is submitted and to compose the improved tag-based search using any combination of the initial tags and the user selected related tags.

14. The computer system as claimed in claim 13 further comprising saving means enabling saving and reuse of any one or combination of tag groups, user groups, resource groups and database specifications.

15. A computer program product comprising:

a computer readable storage medium having a computer readable program, wherein the computer readable program when executed on a computer causes:

initiating a subject search, including receiving one or more initial tags entered by a user, the one or more initial tags being of the initiated subject search being initially defined by the user;

intervening before submission of a search request representing the initiated subject search, and automatically determining related tags to the user entered initial tags, said determining including using a method defined by tag usage of users in the user's organization, and employing a user selected method of determination, wherein the user selected method is any of a method defined by reference to a database of designated experts; a method defined by reference to a first social software system having at least one of the highest frequencies of usage of one initial tag entered by the user, the highest relative proportion of usage of the one initial tag entered by the user, in comparison with other tags used by each potential expert; a method defined by usage of other users whose tag usage is statistically similar to that of the user; a method defined by a list of other users who are selected and added to that list by the user; a method defined by the frequencies of tag co-occurrence across a given database; and a method defined by occurrence of the user's one initial tag within one or more particular tagged resources including bookmarks, documents and people information;

presenting the determined related tags to the user in a manner enabling and assisting the user in refining and redefining the initiated subject search; and user reviewing of the determined related tags and selection there from, the user selected related tags redefining the initiated subject search and forming an effectively improved tag-based search relative to the initiated subject search as initially defined by the user.

* * * * *